United States Patent [19]

Pearce et al.

[11] Patent Number: 5,809,219
[45] Date of Patent: Sep. 15, 1998

[54] ANALYTIC MOTION BLUR COVERAGE IN THE GENERATION OF COMPUTER GRAPHICS IMAGERY

[75] Inventors: Andrew P. Pearce, Toronto; Kelvin Hsien Ching Sung, Markham, both of Canada

[73] Assignee: Silicon Graphics, Inc., Mountain View, Calif.

[21] Appl. No.: 632,661

[22] Filed: Apr. 15, 1996

[51] Int. Cl.⁶ .......................... G06T 15/50; G06T 15/70
[52] U.S. Cl. .......................... 395/126; 395/130; 395/175
[58] Field of Search .................................. 395/130, 173, 395/175, 126

[56] References Cited

U.S. PATENT DOCUMENTS

| | | | |
|---|---|---|---|
| 4,897,806 | 1/1990 | Cook et al. ............................... | 345/426 |
| 5,025,394 | 6/1991 | Parke ........................................ | 395/175 |
| 5,025,400 | 6/1991 | Cook et al. ............................... | 345/425 |
| 5,239,624 | 8/1993 | Cook et al. ............................... | 345/425 |

OTHER PUBLICATIONS

Carpenter, L., "The A–buffer an Antialiased Hidden Surface Method," *Computer Graphics*, vol. 18, No. 3, pp. 103–108, Jul. 1984.

Chen, S., et al., "View Interpolation for Image Synthesis," *Computer Graphics Proceedings, Annual Conference Series*, pp. 278–288, 1993.

Cook, R., et al., "Distributed Ray Tracing," *Computer Graphics*, vol. 18, No. 3, pp. 137–145 Jul. 1984.

Cook, R., et al., "The Reyes Image Rendering Architecture," *Computer Graphics*, vol. 21, No. 4, pp. 95–102, Jul. 1987.

Fiume, E., et al. "A Parallel Scan Conversion Algorithm with Anti–Aliasing for a General–Purpose Ultracomputer," *Computer Graphics*, vol. 17, No. 3, pp. 141–150, Jul. 1983.

Glassner, A., "Spacetime Ray Tracing for Animation," *IEEE Computer Graphics & Applications*, pp. 60–70, 1988.

Grant, C., "Integrated Analytic Spatial and Temporal Anti–Aliasing for Polyhedra in 4–space," *Computer Graphics*, vol. 19, No. 3, pp. 79–84, Jul. 1985.

Haeberli, P., et al., "The Accumulation Buffer: Hardware Support fo High–Quality Rendering," *Computer Graphics*, vol. 24, No. 4, pp. 309–318, Aug. 1990.

Korein, J., et al., "Temporal Anti–Aliasing in Computer Generated Animation," *Computer Graphics*, vol. 17, No. 3, pp. 377–388, Jul. 1983.

Lee, M,, "Statistically Optimized Sampling for Distributed Ray Tracing," *Computer Graphics*, vol. 19, No. 3, pp. 61–67, Jul. 1985.

Max, N., et al., "A Two–and–a–Half–D Motion–Blur Algorithm," *Computer Graphics*, vol. 19, No. 3, pp. 85–93, Jul. 1985.

McCool, M., "Analytic Antialiasing with Prism Splines," *Computer Graphics Proceedings, Annual Conference Series*, pp. 429–436, Aug. 6–11, 1995.

Mitchell, D., "Spectrally Optimal Sampling for Distribution Ray Tracing," *Computer Graphics*, vol. 25, No. 4, pp. 157–164, Jul. 1991.

Potmesil, M., "Modeling Motion Blur in Computer–Generated Images," *Computer Graphics*, vol. 17, No. 3, pp. 389–399, Jul 1983.

Wloka, M., et al., "Interactive Real–Time Motion Blur," *Proceedings of CGI 1994*, 1994.

Woo, A., "Efficient Computations in Ray Tracing," *IEEE Computer Graphics & Application*, vol. 13, No. 5, pp. 78–83, Sep. 1993.

*Primary Examiner*—Mark K. Zimmerman
*Attorney, Agent, or Firm*—Sterne, Kessler, Goldstein & Fox P.L.L.C.

[57] ABSTRACT

A system and method for simulating motion blur. Intersections of pixel sampling points with leading and trailing edges of moving polygons are identified. The intersection points define segments of coverage of the pixel sampling point by a polygon. A segment list is sorted to identify segments that are associated with visible polygons. The segments of visible polygons are passed to shading and texturing functions which individually determine the temporal sampling points for a single polygon or a group of polygons.

24 Claims, 8 Drawing Sheets

ANALYTIC MOTION BLUR COVERAGE IN THE GENERATION OF COMPUTER GRAPHICS IMAGERY

BACKGROUND OF THE INVENTION

1. Field of the Invention

The present invention relates generally to computer graphics imagery, and more specifically, toward the simulation of motion blur in computer generated imagery.

2. Related Art

Individual frames within a sequence of frames recorded using standard video and film cameras often contain noticeable blurring of moving objects. This blurring is rarely noticeable when these frames are played back at the same rate at which they were recorded. A viewer uses the blurriness of the object in the individual frames to make assumptions about its relative velocity and predictions about its position in subsequent frames.

In computer generated animation, on the other hand, a frame is typically generated by sampling an application model at an instant of time. Effectively, the sampling model simulates an instantaneous shutter on a video camera. This form of sampling is satisfactory with scenes of low and moderate action. However, unpleasant stroboscopic effects (e.g., jerkiness) are evident when rapidly moving objects are present. This results since computer generated animation lacks the real-world motion blur of a moving object.

To compensate for these deficiencies, simulated motion blur is used in computer generated imagery to mitigate visually objectionable artifacts that result from the discrete nature of sampling. Motion blur simulations enable an animator to recreate the short-duration exposure intervals of real-world video shutters. Seamless integration of animation and real-world footage can therefore occur. The perceived realism of these integrations will continue to increase as the motion blur simulations improve. Since the simulation of motion blur is computationally expensive, what is needed is an efficient method for handling motion blur in large scenes having arbitrary shaders, textures, transparent objects and surface tessellations (e.g., a polygon mesh).

SUMMARY OF THE INVENTION

In the present invention, motion blur simulation for an exposure interval is provided by analyzing the movement of tessellated representations of surfaces relative to a stationary sampling point on a pixel. The movement of a polygon in the tessellated representation of a surface is approximated by a linear transform of the polygon's vertices. The error of this approximation can be mitigated by increasing the number of linear transforms over the exposure interval.

Polygon movement is analyzed by identifying the intersections between the leading and trailing edges of each individual polygon with the stationary sampling point. These intersection points define the boundaries of segments that indicate the sub-interval of exposure time where the sampling point is inside the polygon. If the sampling point starts inside the polygon or ends up inside the polygon, the segment is bounded by the start or end of the exposure interval, respectively. Each of these segments are placed in a list that is associated with the sampling point.

The list of segments is then sorted to remove portions of segments that are occluded and segments that are completely occluded. The remaining visible surface list contains only segments that are associated with visible polygons. These visible polygons contribute to the shading and texture value that is calculated for the sampling point. Segments associated with transparent polygons also include a transparency chain that identifies polygons that are visible through these transparent polygons.

The polygons in the visible surface list are then grouped together based upon the continuity of time coverage. These groupings allow the reduction of computational complexity when evaluating the shading and texturing functions by sampling the shading and texturing data with less frequency than the geometric intersections would otherwise dictate.

The shading process considers the surface type of the object that the group of polygons represents. For example, the shading sampling rate is kept to a minimum if the surface is uniform. Conversely, the shading sampling rate is increased when the surface of the object is bumped or displacement mapped, highly specular, etc. Computational complexity of the motion-blur system is thereby adopted to the geometric and material properties of the objects that the system processes. Deterministic or stochastic methods can be used to position the sampling points in the temporal domain.

The texture sampling rate and sampling positions are determined independently of the shading process. Textures often include higher frequency patterns and therefore require a higher sampling rate. Since a texture function's look up in a texture file is much less intensive than a shading function's calculation of a reflection model, a minimal penalty in system throughput is incurred. Analytic, deterministic or stochastic methods can be used to identify the position of the texture sampling points in the temporal domain.

After each of the groups of polygon segments in the visible surface list have been processed, the system combines the results based upon the time coverages of each of the groups. The final value yields the shading or texture for that particular sampling point.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Computer graphics applications often require the generation of complex 3D surfaces (e.g., representing a car, a face, etc.). In one conventional method, the surfaces are modeled using Non-Uniform Rational Bsplines (NURBS), which are then approximated with a mesh (or tessellation) of polygons (e.g., triangles). Generally, a polygon mesh is a collection of edges and vertices. An edge connects two vertices, and a polygon is a closed sequence of edges. NURBS are described in greater detail in J. D. Foley et al., "Computer Graphics: Principles and Practice," 2nd ed., Addison-Wesley Publishing, 1990, which is incorporated by reference in its entirety.

Figure 1:
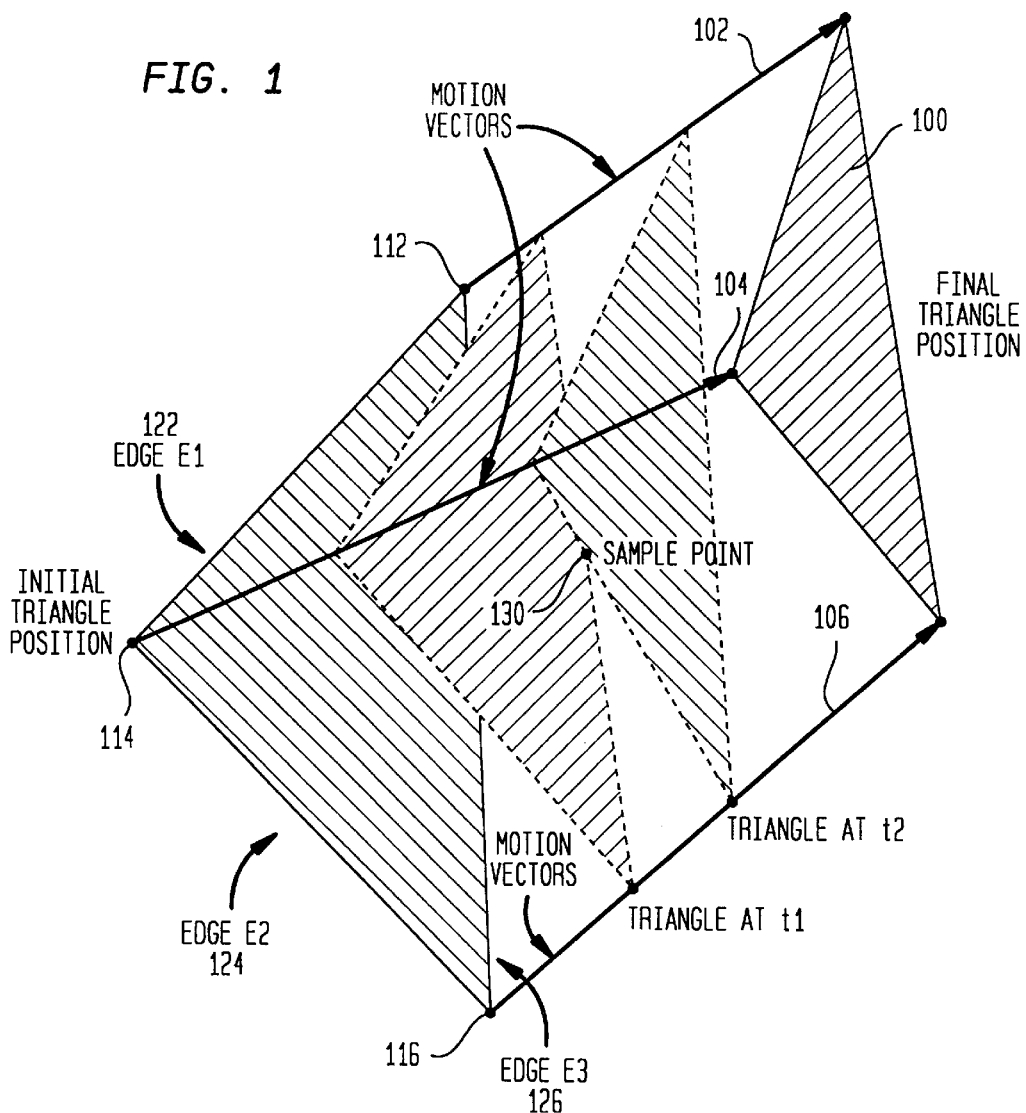
FIG. 1 illustrates the motion vectors for the vertices in a polygon.

After an object has been tessellated into polygons, movement of the object in 3D space can be described through a set of motion vectors for each of the polygons. Specifically, each motion vector describes the linear transformation of a particular vertex of the polygon between two instants in time. FIG. 1 illustrates the motion vectors for the vertices in a three-vertex polygon. As demonstrated, motion vectors 102, 104, and 106 individually describe the motion of vertices 112, 114, and 116, respectively as three-vertex polygon 100 moves from an initial to a final position.

In the context of a single frame (or exposure interval), a polygon is described in at least two positions, shutter-open ($S_{open}$) and shutter-closed ($S_{closed}$). These positions correspond to the opening and closing of an actual video camera shutter. Assuming linear motion, a single motion vector can describe the movement of a single vertex between the $S_{open}$ and $S_{closed}$ positions. As one can readily appreciate, non-linear movement can be suitably approximated by defining one or more additional shutter-mid positions ($S_{mid}$) Each additional position defined would require an additional motion vector to describe the now piece-wise linear movement of the vertices between the $S_{open}$ and $S_{closed}$ positions.

Generally, the display of object movement between the $S_{open}$ and $S_{closed}$ positions is the simulation of real-world motion blur. These operations seek to match the look and feel of real-world video camera images that result from short-duration (rather than instantaneous) film exposure. As will be described in greater detail below, this process relies upon the calculation of the geometric coverage of a screen sampling point by a moving polygon.

Figure 2:
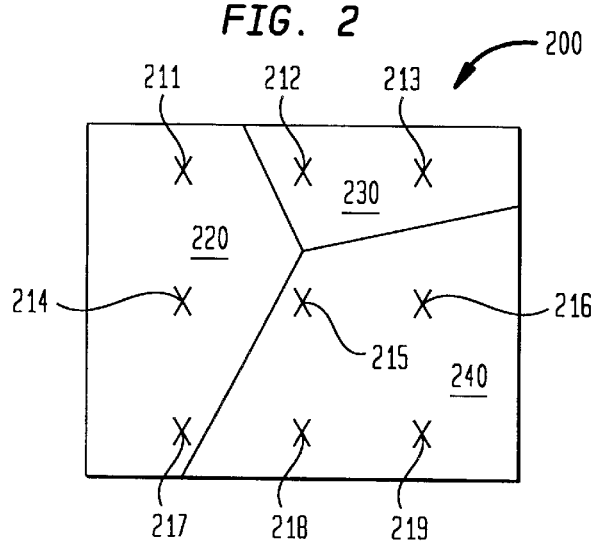
FIG. 2 illustrates the concept of a screen sampling point.

A pixel can have more than one screen sampling point. In this supersampling process, the sampling points can be layed out in a grid as shown in FIG. 2. In this example, a single pixel 200 contains nine sampling points 211–219. The number of sampling points and the position of the sampling points within a pixel can vary. For example, the position of the nine sampling points 211–219 could be fixed in a uniform pattern as shown in FIG. 2. Alternatively, the position of each of the nine sampling points 211–219 within predefined ranges could be probabilistically determined.

In either case, the number and position of sampling points 211–219 is chosen to provide a sufficient approximation of the color and/or intensity of pixel 200. In the example of FIG. 2, pixel 200 includes three separate regions 220, 230, 240. Each of regions 220, 230, 240 can represent at least part of a separate and distinct polygon, where each polygon has a separate color (e.g., red, green, and blue, respectively).

To determine the color value of pixel 200, a weighted or unweighted average of the color values of each of pixel sampling points 211–219 (and possibly including sample points from neighboring pixels) is determined. For example, in an unweighted average, sampling points 211–219 contribute equally to the final color value. For pixel 200, the final color value is 3/9 red (sampling points 211, 214, 217), 2/9 green (sampling points 212, 213), and 4/9 blue (sampling points 214, 216, 218, 219). As one can readily appreciate, the sampling point configuration of FIG. 2 yields only an approximation of the relative fractional coverage of pixel 200 by each of regions 220, 230, 240. Increased accuracy can be obtained by directly or indirectly identifying, with greater precision, the boundaries between regions 220, 230, 240.

In the example of FIG. 2, the color and/or intensity value of pixel 200 is calculated for a stationary pattern. In simulating motion blur, on the other hand, regions 220, 230, 240 may each be moving in separate directions during the exposure interval. Consequently, each of regions 220, 230, 240 may cover one or more sampling points within pixel 200 for only a fraction of the exposure interval. The calculation of a color and/or intensity value for a pixel in the simulation of motion blur therefore incorporates a temporal element.

Figure 3:
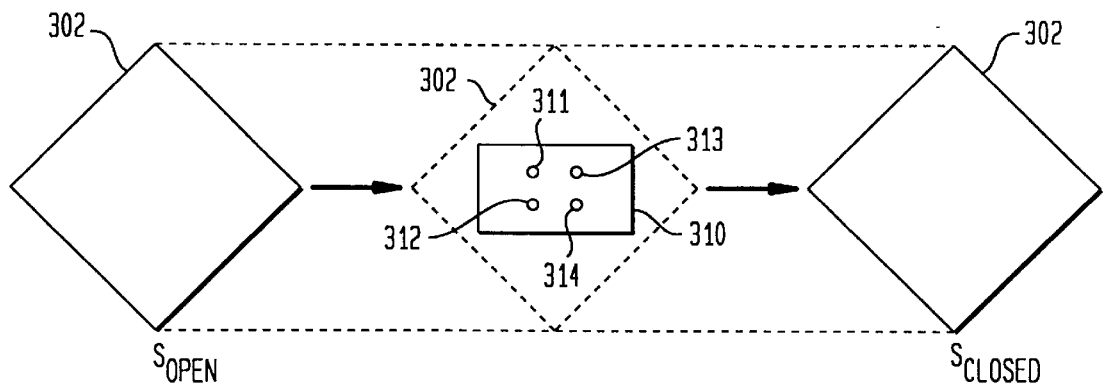
FIG. 3 illustrates the movement of a polygon between the $S_{open}$ and $S_{closed}$ positions with respect to a single sampling point.

For example, consider FIG. 3 which illustrates the movement of a polygon 302 between the $S_{open}$ and $S_{closed}$ positions. During an intermediate period of time, polygon 302 covers pixel 310. An estimate of the time that polygon 302 covers pixel 310 can be provided by temporal sampling at one or more sampling points 312. For example, assume that ten samples are taken at sampling point 312 during the exposure interval. If three samples intersect polygon 302, then polygon 302 is estimated to have a 0.3 coverage factor of sampling point 312. Other polygons may similarly cover sampling point 312 and produce their own coverage factors. The color and/or intensity value for sampling point 312 is determined through weighted or unweighted averages of the coverage factors for each of the polygons that intersect with sampling point 312. Next, the final color and/or intensity value of pixel 310 is determined through a weighted or unweighted average of the values of each of the individual sampling points 311–314. As one can readily appreciate, an increase of the number of samples during the exposure interval at sampling point 312 also increases the accuracy of the temporal coverage factor for a single polygon.

In contrast to this method, the present invention determines the interval of time that polygon 302 contains sampling point 312 by identifying the points in the time domain that the sampling point 312 is inside or touches the edges of polygon 302. For most polygons, this process can be reduced to a 2D problem by projecting a polygon along the sampling rays associated with the sampling points.

Figure 4:
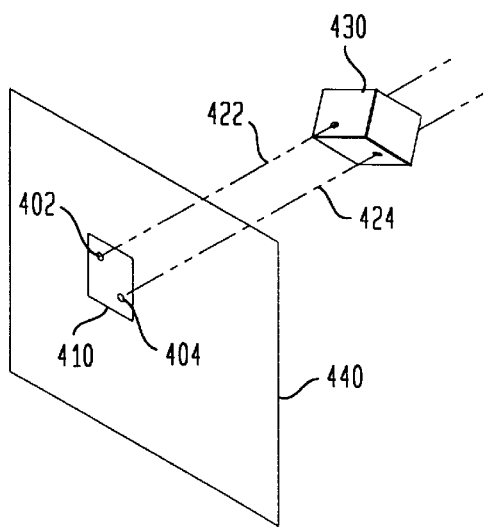
FIG. 4 illustrates the projection of a polygon along a sampling ray into the image plane.

FIG. 4 illustrates an exemplary 2D projection. In this example, pixel 410 is shown as having two sampling points 402 and 404. Sampling rays 422, 424 associated with sampling points 402, 404, respectively, are projected (typically perpendicular) from an image plane 440 (i.e., in screen space). In this ray tracing procedure, one or more polygons (not shown) on object 430 are matched to the x,y coordinates of sample points 402, 404. Clearly, polygons on objects at different depths (z coordinate) can reside at a single x,y coordinate.

Within this projected 2D space, the present invention identifies the segments of time during which a sampling point is inside a moving polygon. More specifically, the present invention intersects a stationary sampling point with the moving edges of a polygon. Each of the edges of the polygon are examined independently. In this examination, the intersection point on the edge of the polygon and the time of intersection are determined by solving a simple three-point collinear condition where the three points are the sampling point and the two vertices of the moving edge. For computational efficiency, the edge intersection points can be re-used for adjacent polygons. This results since in a polygon mesh the exit point from polygon will be the entry point for the next polygon.

More generally, however, the determination of the intersections between moving polygons and sampling rays associated with sampling points can be performed in 3D space. Rather than identifying the intersection of sampling points with edges of projected 2D polygons, the process identifies the intersection of sampling rays with edges of moving 3D polygons. In one example, these 3D calculations can be used in identifying the motion-blur contribution of polygons that are moving through the near clipping plane.

An example of the 2D intersections is described with reference back to FIG. 1. Polygon 100 has three edges 122, 124, and 126. As polygon 100 moves to time $t_1$, edge 126 intersects with stationary sampling point 130. Edge 126 is the leading edge of polygon 100 and represents the start of the time segment during which sampling point 130 is inside polygon 100. As polygon 100 continues to move to the final position (i.e., position at $S_{closed}$), trailing edge 124 intersects with sampling point 130 at time $t_2$. Time $t_2$ represents the end of the segment during which sampling point 130 is inside polygon 100. The duration during which polygon 100 is visible at sampling point 130 is therefore $t_2-t_1$.

Figure 12:
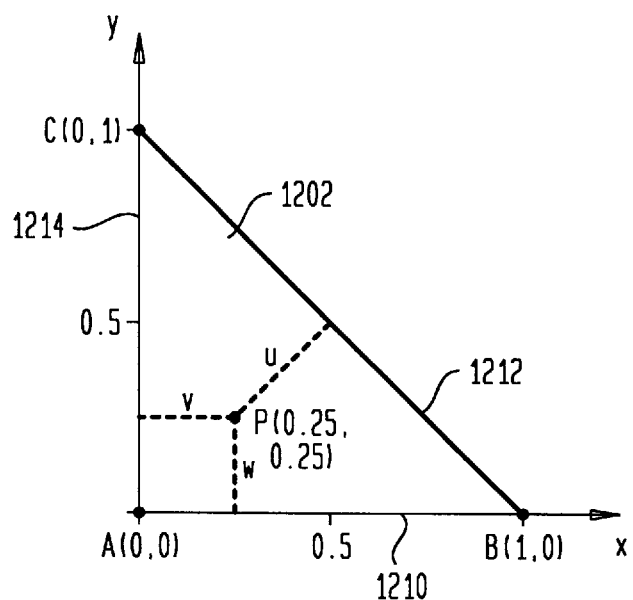
FIG. 12 illustrates barycentric coordinates in a three-vertex polygon.

The previous example assumed that stationary sampling point 130 started at a point outside of polygon 100. Sampling point 130 could also start at a point inside polygon 100. In a preferred embodiment, a barycentric inside/outside test is used to determine whether a point lies inside a three-vertex polygon. This process is described with reference to three-vertex polygon 1202 of FIG. 12. To determine whether point P lies inside three-vertex polygon 1202, a barycentric combination of vertices A(0,0), B(1,0) and C(0,1) is first defined by the equation uA+vB+wC=P. The barycentric coordinates (u,v,w) of point P define the distance of point P from the edge opposite the corresponding vertex. For polygon 1202, u defines the distance of point P (on a perpendicular line) from edge 1212, v defines the distance of point P from edge 1214, and w defines the distance of point P from edge 1210. The barycentric coordinates (u,v,w) are bounded by the equality u+v+w=1. If $0.1 \leq u \leq 1.0, 0.0 \leq v \leq 1.0$, and $0.0 \leq w \leq 1.0$, then point P lies inside the three-vertex polygon.

In calculating u, v and w, the following equations are used:

$$uA_x+vB_x+wC_x=P_x$$

$$uA_y+vB_y+wC_y=P_y$$

For three-vertex polygon 1202, these equations are reduced to:

$$u*0+v*1+w*0=0.25$$

$$u*0+v*0+w*1=0.25$$

The simple solution of these equations yields v=0.25 and w=0.25. Since u+v+w=1, the value of u is necessarily equal to 0.5. Since $0.0 \leq u \leq 1.0, 0.0 \leq v \leq 1.0$, and $0.0 \leq w \leq 1.0$, point P is determined to be inside polygon 1202.

For sampling points that start inside a polygon, the time segment starts at the polygon's initial position (i.e., $S_{open}$) and ends at either the time the trailing edge intersected with the sampling point or the time of the polygon's final position (i.e., $S_{closed}$). In a similar manner, a sampling point can start outside a polygon and end up inside the polygon. If the initial and final points lie inside the polygon, the segment is bounded by both the $S_{open}$ and $S_{closed}$ times.

The intersection calculations described above are repeated for each of the polygons that intersect with that sampling point. The list of these polygons can be determined by examining the convex hull of each of the moving polygons on the screen. In the context of FIG. 3, the convex hull can be thought of as the aggregate area that polygon 302 covers as it moves from the $S_{open}$ to the $S_{closed}$ positions. The convex hull of a moving polygon therefore identifies all of the sampling points that the moving polygon intersects. For each sampling point intersected, the moving polygon is added to the individual list associated with each of the sampling points. Each polygon is examined in this manner until the sampling point lists are completed. Due to memory considerations, parts of the screen can be processed separately.

Figure 5:
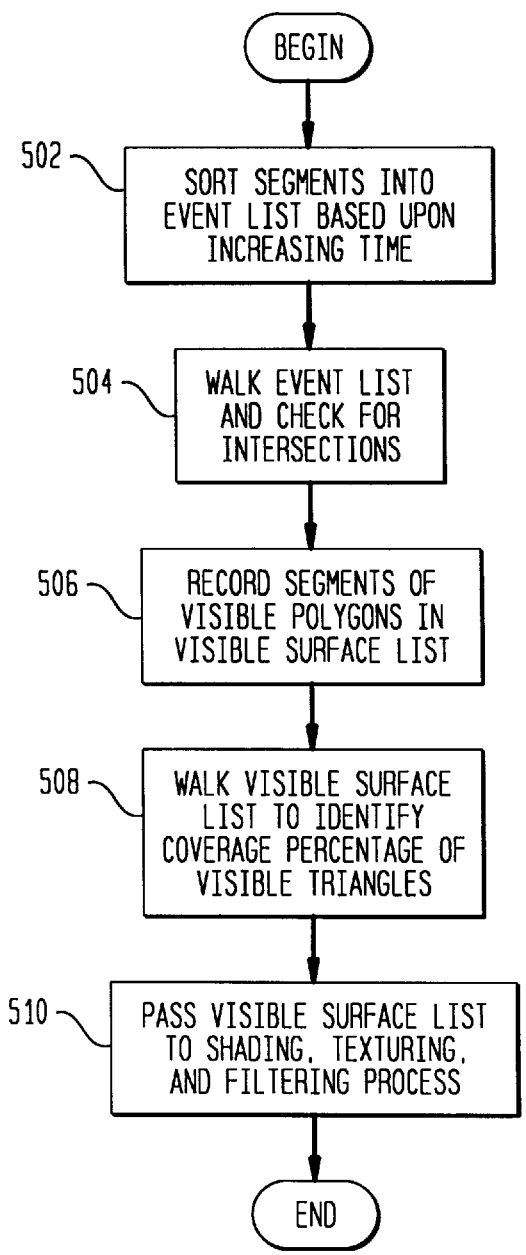
FIG. 5 illustrates a flow chart of a segment list sorting process according to the present invention.

After all polygons in a sampling point list (i.e., visible or non-visible polygons that project onto the sampling point) have been analyzed, the generated segment list is sorted. Sorting is based upon the times of sampling point intersection and the depth of the polygon that produced the segment. This process is described with reference to the flow chart of FIG. 5.

As illustrated, the sorting process begins in step 502 where the segments are analyzed to produce an event list. The event list is based upon increasing time and contains a sequential list of start and end points for segments in the segment list. The end point for a segment does not necessarily follow the start point for that segment. This results since a leading edge of a second polygon can intersect a sampling point prior to the intersection of a trailing edge of a first polygon with the sampling point.

Figure 6:
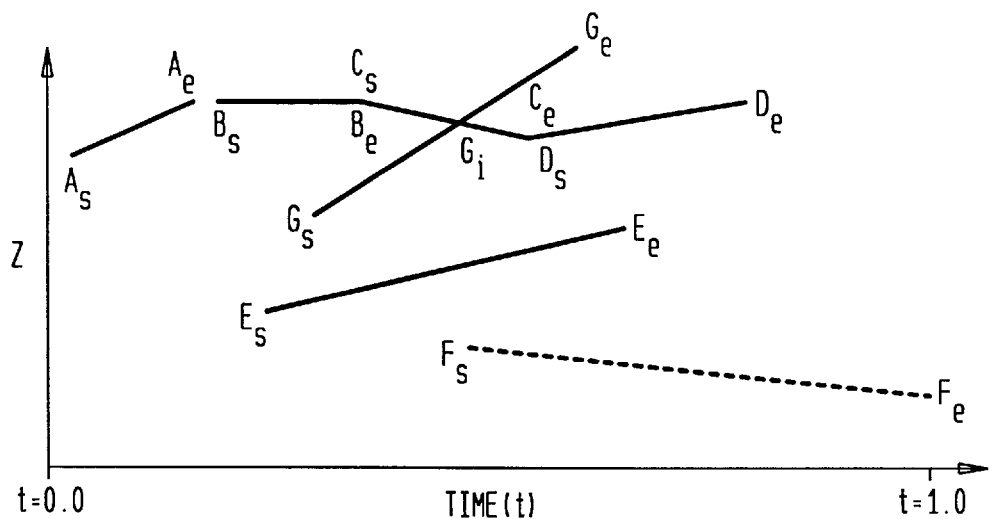
FIG. 6 illustrates an exemplary segment list.

These dynamics are illustrated with reference to the graphical representation of an exemplary segment list in FIG. 6. The segments in FIG. 6 are drawn with respect to the z (depth) and t (time) axes. An increase in the z direction correlates to increasing depth. An increase in the t direction from 0.0 to 1.0 correlates to the movement from the $S_{open}$ to the $S_{closed}$ positions.

Each of the segments in FIG. 6 are generated based upon the intersection of leading and/or trailing edges with a stationary sampling point. For example, the segment list starts with the movement of polygon A through the sampling point. This movement produces segment A. Segment A is defined by the intersection points $A_s$ and $A_e$ which identify the intersection of the leading edge of polygon A with the sampling point and the intersection of the trailing edge of polygon A with the sampling point, respectively.

After polygon A moves through the sampling point, the leading edge of polygon B intersects with the sampling point (i.e., start point $B_s$). However, prior to the intersection of the trailing edge of polygon B with the sampling point (i.e., end point $B_e$), the leading edges of polygons E and G consecutively intersect with the sampling point (i.e., start points $E_s$ and $G_s$, respectively). By recording the sequential appearance of each of the individual start and end points, the event list at this point can be described as $A_s, A_e, B_s, E_s, G_s$. This process continues through each of the start and end points of the segments until $S_{closed}$ is reached. At completion, the final event list for the example of FIG. 6 would appear as follows:
$A_s$, $A_e$, $B_s$, $E_s$, $G_s$, $B_e$, $C_s$, $F_s$, $C_e$, $G_e$, $D_s$, $E_e$, $D_e$, $F_e$ After the event list is generated, the process continues to step 504. In step 504, the event list is "walked" to identify any intersections within the segment list. A segment list intersection can occur when a pair of objects have a change of visibility through movement in the z-direction. For example, a foreground object and a background object can switch positions when the background object moves through the foreground object. In this scenario, a polygon on the foreground object is visible for only part of the time (i.e., until it recedes into the background) that it contains the stationary sampling point.

For this reason, at the start of each segment in the segment list, the segment is checked for intersection in the z-direction along the length of time of the segment. In the example of FIG. 6, an intersection is identified for segment G at point $G_i$. When this intersection is detected, an intersection event $G_i$ is added to the event-list at the appropriate time location (i.e., between events $C_s$ and $F_s$). The new event list is now represented by:
$A_s$, $A_e$, $B_s$, $E_s$, $G_s$, $B_e$, $C_s$, $G_i$, $F_s$, $C_e$, $G_e$, $D_s$, $E_e$, $D_e$, $F_e$ Referring again to FIG. 5, the process continues in step 506 where segments of visible polygons are recorded in a visible surface list. In one embodiment, the segments that are recorded in the visible surface list are bounded by (1) the start of a visible segment and (2) the end of the visible segment, the start of a segment closer to the eye, the intersection in Z of another segment, or the start or end of a segment behind the visible segment if the visible segment is transparent. The impact of these events on the visible surface list are illustrated again by reference to the example of FIG. 6.

The first segment that enters the visible surface list is segment $A_s$-$A_e$ which is visible in its entirety. The next segment begins at point $B_s$ and ends at point $E_s$. This results since polygon E that creates segment $E_s$-$E_e$ is closer to the eye relative to polygon B that creates segment $B_s$-$B_e$. The same situation occurs in the next segment $E_s$–$F_s$ which results since the transparent polygon F that creates segment $F_s$-$F_e$ is closer to the eye relative to polygon E that creates segment $E_s$-$E_e$.

Although the polygon that creates segment $F_s$-$F_e$ is closest to the eye for its duration, it is not recorded as a solitary segment in the visible surface list. Segment $F_s$-$F_e$ is broken up into multiple segments based upon the start or end of a segment behind the transparent polygon. Specifically, segment $F_s$-$F_e$ is divided into three segments $F_s$-$E_e$, $E_e$-$D_e$, and $D_e$–$F_e$. In a preferred embodiment, segments $F_s$-$E_e$ and $E_e$-$D_e$ are recorded in the visible surface list along with information identifying the visible polygon that is behind transparent polygon F. For segment $F_s$-$E_e$, the visible polygon is polygon E. For segment $E_e$-$D_e$, the visible polygon is polygon D. Segment $D_e$–$F_e$, on the other hand, has no visible polygons behind it and is recorded in a standard manner. By this process, the coverage of polygons behind transparent polygon F is incorporated into the shading and texturing phases. The shading and texturing phases are described in greater detail below.

After the process of step 506 is completed, a representative visible surface list can be represented by the list in Table 1. Each segment in the visible surface list identifies the polygon (e.g., A) and the time points bounding the time of the polygon's coverage (e.g., $A_s$,$A_e$) of the sampling point. If the polygon that generates a particular segment is transparent and a visible object is behind it, the segment includes a transparency chain. This transparency chain is denoted by "->".

TABLE 1

| Segment | Coverage |
|---|---|
| A($A_s$,$A_e$) | 0.12 |
| B($B_s$,$E_s$) | 0.05 |
| E($E_s$,$F_s$) | 0.20 |
| F($F_s$,$E_e$) -> E | 0.16 |
| F($E_e$,$D_e$) -> D | 0.16 |
| F($D_e$,$F_e$) | 0.18 |
| TOTAL | 0.87 |

As noted in the first column of Table 1, each segment in the visible surface list identifies the time points that bounds the coverage of the sampling point by a visible polygon. These time points are used to generate the coverage factors that are illustrated in the second column of Table 1. In one embodiment, threshold determinations of these coverage factors can be used to determine whether a visible segment should be added to the visible surface list. This threshold determination can reduce the subsequent processing by eliminating visible segments having minimal effect on the shade and/or texture at that sampling point.

After the event list has been "walked" and a visible surface list has been generated, the process continues to step 508 where the total coverage percentage of all visible polygons is determined. In the example of FIG. 6, the resulting visible surface list of Table 1 indicates that the total coverage percentage of all visible polygons is 0.87. This total is subtracted from 1.0 to determine the percentage of time that the background is visible at that sampling point during the exposure interval. In this example, the background would be visible for 0.13 of the time. This information along with the visible surface list is passed in step 510 to the shading, texturing and filtering functions. Each of these functions are individually described below.

With respect to shading, an ideal evaluation of the intensity for a particular polygon is based upon an integral of the shading function I(x,y,z) over the exposure interval. In practice, an analytic solution of this integral is impossible due to the complexity of the shading function. Therefore, approximations of this integral are obtained through numeric integration (i.e., temporal samples) over the exposure interval of a polygon.

When dealing with surface tessellations, however, the number of polygons that are visible to a sampling point over the exposure interval $S_{open}$-$S_{closed}$ often numbers in the thousands. In these scenarios, the computational complexity can become prohibitive. Accordingly, in a preferred embodiment, the temporal sampling rates of the polygons that produce visible segments in the visible surface list are dynamically adjusted.

Figure 7:
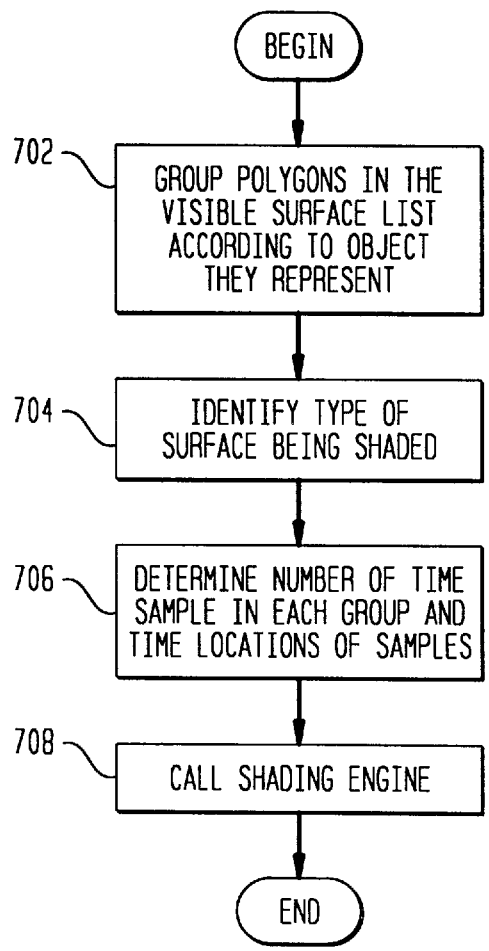
FIG. 7 illustrates a flow chart of a shading process according to the present invention.

This dynamic adjustment process is described with reference to the flowchart of FIG. 7 and the example of FIG. 8. As illustrated in FIG. 7, the process begins in step 702 where polygons in the visible surface list are grouped according to the object they represent. These groups, rather than individual polygons, are numerically integrated to determine the shading of the surface.

This grouping procedure groups polygons that have continuous time coverages. This criteria ensures that the sampling point will lie on a tesselated portion of an object within the covered range of the group. An example of a span of polygons is illustrated in FIG. 8. In this simple example, polygons 801–807 maintain a constant shape as they traverse the screen from right to left. The constant shape of polygons 801–807 is not a limitation. It is used to simplify the illustration of a path that a stationary sampling point effectively takes through a polygon mesh.

This movement starts at the beginning of the exposure interval ($S_{open}$) where the sampling point is inside polygon 801 (position 822). As object 800 moves from right to left (as indicated by arrow 840), the sampling point sequentially intersects with the leading and/or trailing edges of polygons 801–807. At the end of the exposure interval ($S_{closed}$), the sampling point is inside polygon 807 (at position 824).

The intersection of the sampling point with the leading and/or trailing edges of polygons 801–807 defines individual paths 811–817 on polygons 801–807. The end points of individual paths 811–817 are defined by the points of intersection on the leading and trailing edges (not labeled). Each of individual paths 811–817 are associated with segments that are recorded in the visible surface list. When the visible surface list is examined, each of polygons 801–807 can be considered as a group since the continuity criteria is satisfied.

In a preferred embodiment, the grouping procedure does not group polygons together where the polygons abut in space and time, but have different normals on their shared vertices. This scenario could occur where a an edge between two adjacent polygons represents a discontinuity (e.g., a corner). In this case, the polygons are separately grouped into two groups that each comprise polygons on one side of the discontinuity. The two groups of polygons are thereafter processed independently.

With respect to transparent polygons, similar rules apply. If no object is visible through the transparent polygon, the same conditions for grouping non-transparent polygons apply. If a transparency chain exists, however, the grouping should consider discontinuities in the background polygon as well.

After this grouping process is completed for all polygons within the visible surface list, the process continues to step 704. In step 704, both the number of samples and the time locations of those samples on a group of polygons is determined. More generally, the process starting at step 704 is applicable to the determination of the number of samples and the time locations of those samples on a non-tesselated part of a generically modeled (e.g., NURBS) three dimensional surface. In a similar manner to a group of polygons, the non-tesselated part of the generically modeled surface represents a continuous portion of the surface that the sampling point intersects.

With respect to the number of samples, the type of surface being shaded is considered. For example, bump and displacement mapped objects, objects flagged by users as having thin specular highlights, surfaces with more than a threshold normal gradient, etc., can require an increased number of samples.

Figure 8:
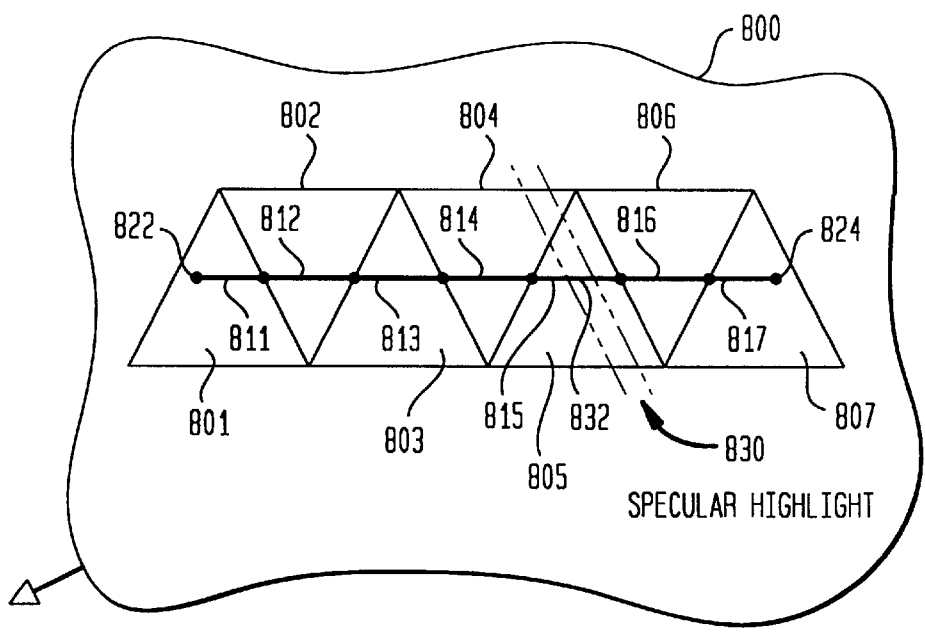
FIGS. 8 and 9 illustrates a grouping of polygons.

FIG. 8 illustrates an example of a thin specular highlight 830 on the surface of object 800. As demonstrated, specular highlight 830 impacts the shading of polygons 804 and 805. If the time location of the sampling point is not contained within sub-path 832 of path 815, the effect of specular highlight 830 for that sampling point is missed in the shading process. This scenario could occur if path 811–817 is sampled at only one time location.

Generally, if multiple sampling points exist on a pixel (see FIG. 3), multiple opportunities will exist to capture the effect of specular highlight 830 for that pixel. Specifically, multiple path strings (e.g., 811–817) will exist on polygons 801–807. Clearly, as the number of sampling points on a pixel increases, the cost of computations also increase.

As noted above, the present invention addresses this issue of computational complexity by adjusting the number of samples to the type of surface being shaded. In the context of FIG. 8, the number of samples that are chosen can vary depending upon whether specular highlight 830 is present. For example, if specular highlight 830 did not exist on object 800, one shading sample could be taken over the entire path 811–817 over polygons 801–807. Conversely, if specular highlight 830 does exist, multiple samples (e.g., three) could be taken over the entire path 811–817. This increases the probability that one of the shading samples will capture specular highlight 830 on path 815. The computational complexity of the adaptive shading process thereby increases only where necessary.

Figure 13:
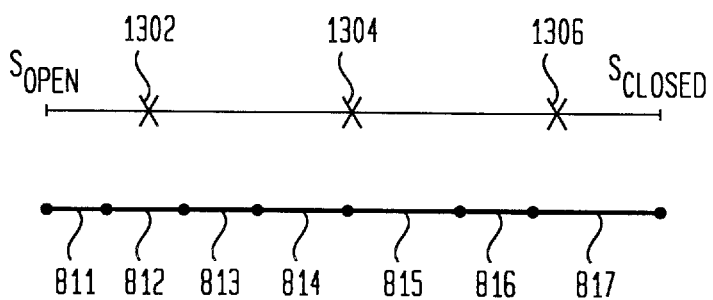
FIGS. 13 and 14 illustrate the temporal position of sampling points using deterministic and stochastic methods.

The choice of time locations of the shading samples, and thus the locations on a polygon, can be determined by deterministic or stochastic methods. For example, consider the path illustrated in FIG. 8. Assume that three samples are to be taken on path 811–817. The relevant determination now is the choice of time positions on path 811–817 where the samples should be taken. In deterministic methods, the time positions of the three points could be predefined at regular intervals across path 811–817. FIG. 13 illustrates an example of this regular spacing. As shown, time positions 1302, 1304, and 1306 are placed at evenly spaced intervals along the path 811–817. Time position 1302 samples polygon 802, time position 1304 samples polygon 805 and time position 1306 samples polygon 807.

Figure 14:
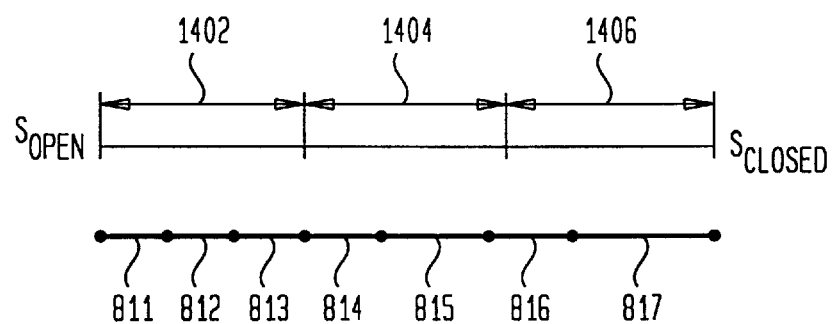

In stochastic methods, the samples are not placed at regularly spaced intervals. In one example illustrated in FIG. 14, the time position of each shading sample is randomly distributed within a part of path 811–817. Specifically, regions 1402, 1404 and 1406 are defined along path 811–817. Each region 1402, 1404, and 1406 contains a single sample time position, the position of which can be uniformly distributed within the respective region 1402, 1404, 1406. In effect, the sharply defined frequency spectrum of the regularly spaced samples of the deterministic method is replaced by a frequency spectrum exhibiting the frequency content of noise.

After the time positions of the samples are identified, the process continues to step 708 where a shading engine is called. The shading engine is operative upon the polygon associated with the time position of the sampling point. For example, in the context of FIGS. 8 and 13, the shading engine at time position 1302 is operative upon polygon 802. The functions performed by the shading engine generally include a query of the light sources to determine diffuse, specular, ambient and other lighting effects. The resulting intensities from these effects are then applied to the surface based upon a reflection model.

As compared to shading, textures can involve higher frequency signals (e.g., cross-hatched or spotted patterns). Although increased sampling is typically required to effectively capture the patterned texture features, these samples are computationally less expensive as compared to samples in the shader. Whereas shading involves the solution of complex reflection models, texturing can involve simple texture file lookup or texture procedure functions.

Figure 15:
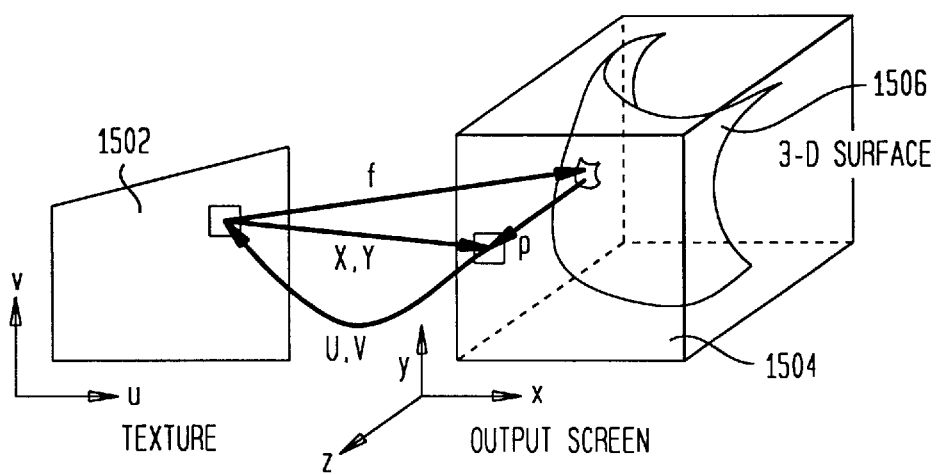
FIG. 15 illustrates an image file texture mapping process.

FIG. 15 illustrates an example of a texture mapping process. This process includes a series of spatial transformations. First, texture space 1502 is transformed onto a 3D surface 1506. This mapping process can be though of as applying image detail to a surface, in much the same way as wallpaper. The image data that is mapped onto 3D surface 1506 is subsequently projected onto image plane 1504 (i.e., screen space) for display. Texture mapping is described in greater detail in G. Wolberg, "Digital Image Warping", IEEE Computer Society Press, 3rd ed., 1994, which is incorporated herein by reference in its entirety.

As noted above, texture sampling is generally computationally cheaper as compared to shading sampling. Accordingly, the texture can be sampled at a higher rate, relative to the shading, along the path of a sampling point over the exposure interval (i.e., $S_{open}$ to $S_{closed}$). The groupings of polygons in the shading function described above can also be used to reduce the number of texture samples required.

Figure 9:
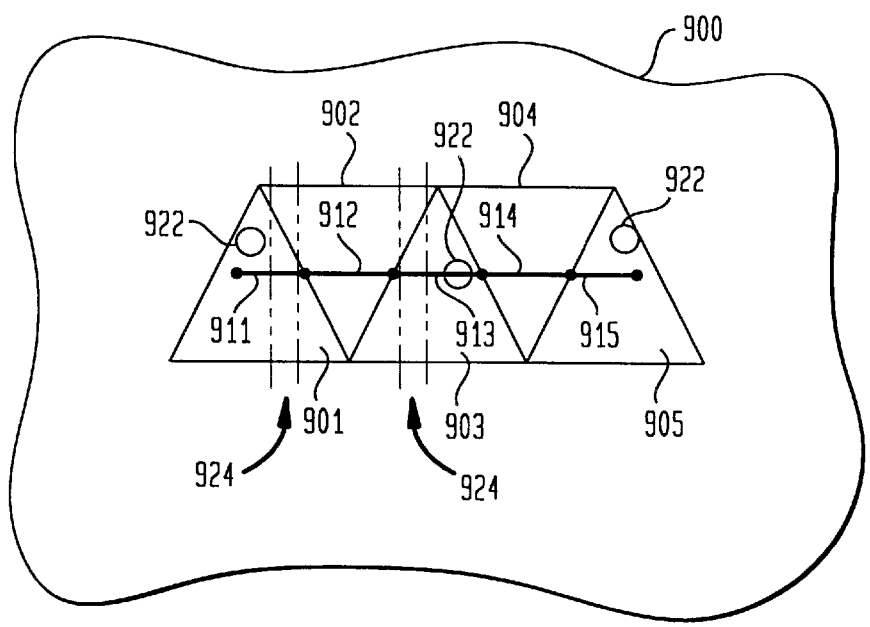

FIG. 9 illustrates an example of veins of texture 924 and spots 922 on the surface of object 900. Object 900 includes polygons 901–905 that have leading and/or trailing edges that intersect with a sampling point in a pixel. These intersection points define paths 911–915. With respect to path 913, the movement of polygon 903 causes the sampling point to pass through both spot 922 and the vein of texture 924.

In the ideal case, motion blurring of texture features 922 and 924 on polygon 903 is performed by integrating the texture value along path 911–915. As an approximation of the integral, various sampling methods can be used. In one method, the texture is adaptively sampled at different times along path 911–915. As is the case in all adaptive techniques, however, if a texture feature is missed, the aliasing can be objectionable. In a second method, jittered sampling is used. In this technique, regularly spaced samples are displaced by a small random distance. A problem that can arise with this technique is a lack of coherence if the sampling rate is not sufficiently high.

Yet another sampling technique is a standard fixed-point numerical quadrature. In this technique, samples are evenly distributed over path 911–915. Problems can arise, however, where high-frequency components and/or fast-moving objects exist. In these scenarios, the high-frequency components or fast-moving objects will display distinct banding, which can prove especially objectionable during motion playback.

As a compromise between these various methods, a preferred embodiment uses a perturbed variation of a fixed-point numerical quadrature. In this technique, intervals are defined for each texture sampling point along path 911–915. Within each of these intervals, texture point sampling is uniformly distributed. In this manner, the high frequency components of the texture are spread out as film grain noise instead of coherent bands.

Figure 10:
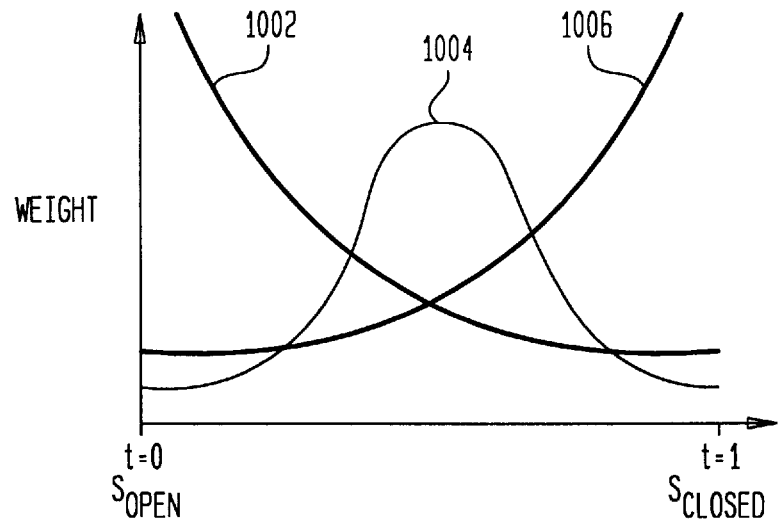
FIG. 10 illustrates various temporal filters for weighting of sampling points.

Finally, the present invention also includes a filtering function. This filtering function enables the system to weight shading and texture samples based upon their time position within the shutter interval (i.e., $S_{open}$ to $S_{closed}$). In this manner, the distortive effects of real-world mechanical shutters can be simulated. Examples of possible temporal filters are illustrated in FIG. 10. Filter 1002 emphasizes samples that are taken at the beginning of the exposure interval, filter 1006 emphasizes samples that are taken at the end of the exposure interval, and filter 1004 emphasizes samples that are taken in the middle of the exposure interval. As one can readily appreciate, any temporal filter can readily be defined and applied to the underlying motion blur simulation.

In addition to the temporal filters described above, a spatial filter can also be defined. This spatial filter can be used alone or in combination with one or more temporal filters. One example of a spatial filter is the emphasis on texture and shading samples that are taken nearer the center of the display. Again, various other spatial filters can be defined alone or in combination with temporal filters.

Figure 11:
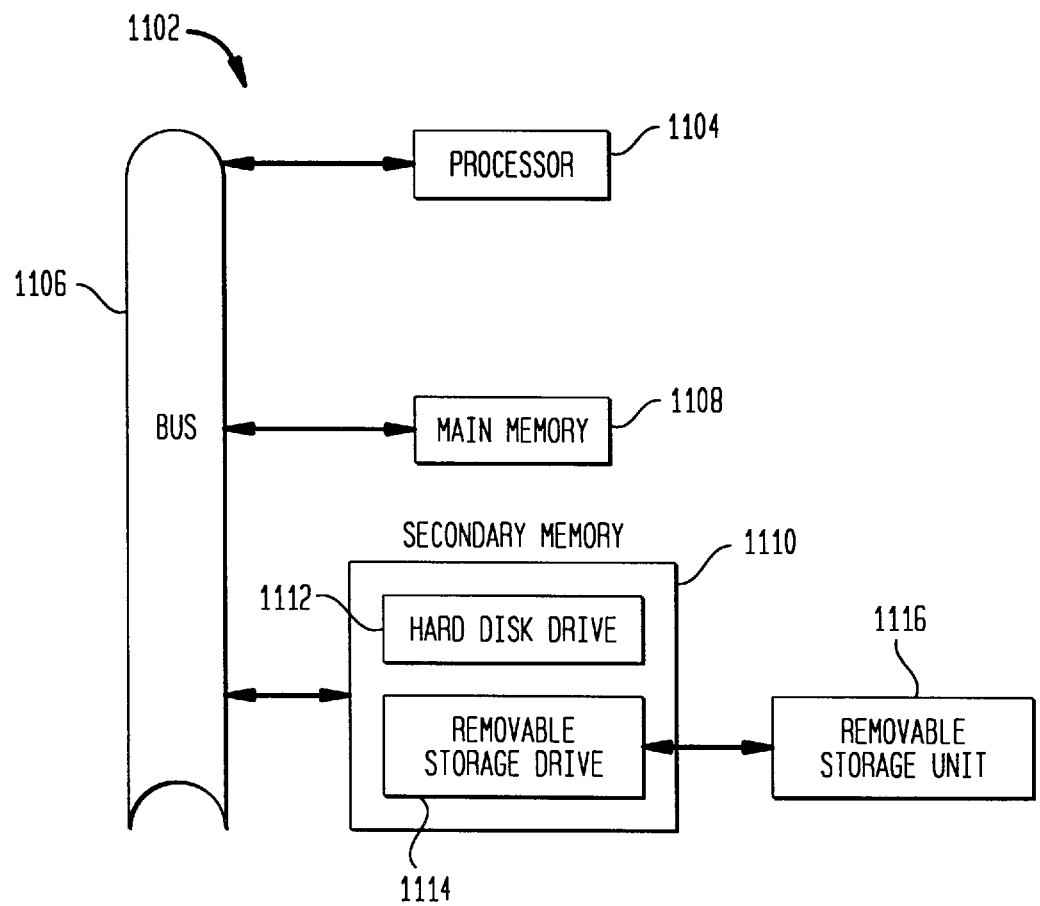
FIG. 11 illustrates a block diagram of a computer useful for implementing elements of the present invention.

In one embodiment, the invention is directed to a computer system operating as discussed herein. An exemplary computer system 1102 is shown in FIG. 11. The computer system 1102 includes one or more processors, such as processor 1104. The processor 1104 is connected to a communication bus 1106.

The computer system 1102 also includes a main memory 1108, preferably random access memory (RAM), and a secondary memory 1110. The secondary memory 1110 includes, for example, a hard disk drive 1112 and/or a removable storage drive 1114, representing a floppy disk drive, a magnetic tape drive, a compact disk drive, etc. The removable storage drive 1114 reads from and/or writes to a removable storage unit 1116 in a well known manner.

Removable storage unit 1116, also called a program storage device or a computer program product, represents a floppy disk, magnetic tape, compact disk, etc. As will be appreciated, the removable storage unit 1116 includes a computer usable storage medium having stored therein computer software and/or data.

Computer programs (also called computer control logic) are stored in main memory and/or the secondary memory 1110. Such computer programs, when executed, enable the computer system 1102 to perform the features of the present invention as discussed herein. In particular, the computer programs, when executed, enable the processor 1104 to perform the features of the present invention. Accordingly, such computer programs represent controllers of the computer system 1102.

In another embodiment, the invention is directed to a computer program product comprising a computer readable medium having control logic (computer software) stored therein. The control logic, when executed by the processor 1104, causes the processor 1104 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A method for simulating motion blur in an exposure interval, comprising the steps of:

(1) identifying an intersection point of an edge of a moving polygon with a stationary sampling point;

(2) generating a segment that identifies a span of time that said stationary sampling point is inside said moving polygon;

(3) for a set of generated segments, generating an event list that includes a sequential list of start and end points of said list of generated segments;

(4) generating a visible surface list that includes a list of visible segments;

(5) placing one or more polygons that are associated with segments in said visible surface list into a group, wherein said group of polygons have a continuous time coverage over an object;

(6) determining a shading sampling rate for said group, wherein said shading sampling rate is dependent upon the type of surface being shaded;

(7) determining one or more shading sampling points for said group;

(8) combining values obtained by said one or more shading sampling points into a shading value for said stationary sampling point;

(9) determining a texture sampling rate for said group, wherein said texture sampling rate is determined independently of said shading sampling rate;

(10) determining texture sampling points for said group; and

(11) combining values obtained by said texture sampling points into a texture value for said stationary sampling point.

2. The method of claim 1, wherein said step (1) comprises the step of solving a three-point collinear condition using said stationary sampling point and the two vertices of said edge.

3. The method of claim 1, further comprising the step of performing a barycentric inside/outside test to determine if a stationary sampling point is inside a polygon.

4. The method of claim 1, wherein said step (3) comprises the steps of:
(a) identifying whether a segment has an intersection in a z-direction along the length of time of said segment; and
(b) adding an intersection event to said event list.

5. The method of claim 1, wherein said step (4) comprises the step of identifying significant events, wherein said significant events include a beginning of a visible segment, an end of a visible segment, an intersection event, a beginning of a segment behind a transparent polygon, and an end of a segment behind a transparent polygon.

6. The method of claim 1, wherein said step (4) comprises the step of creating a transparency chain for a segment associated with a transparent polygon when a polygon is visible through said transparent polygon.

7. The method of claim 1, wherein said step (5) comprises the step of placing polygons that abut in space and time in different groups if a differing normal exists on shared vertices.

8. The method of claim 1, wherein said step (6) comprises the step of increasing said shading sampling rate if bump and displacement mapped objects, thin specular highlights, or higher than a predefined threshold gradients exist.

9. The method of claim 1, wherein said step (6) comprises the step of taking one shading sample on said group.

10. The method of claim 1, wherein said step (7) comprises the step of determining shading sampling points by deterministic methods.

11. The method of claim 1, wherein said step (7) comprises the step of determining shading sampling points by stochastic methods.

12. The method of claim 1, wherein said step (8) comprises the step of combining shading sample values using an unweighted average.

13. The method of claim 1, wherein said step (8) comprises the step of combining shading sample values using a weighted average.

14. The method of claim 1, wherein said step (10) comprises the step of determining texture sampling points by deterministic methods.

15. The method of claim 1, wherein said step (10) comprises the step of determining texture sampling points by stochastic methods.

16. The method of claim 1, wherein said step (10) comprises the step of determining texture sampling points by analytic methods.

17. The method of claim 1, wherein said step (11) comprises the step of determining texture sampling point values using an unweighted average.

18. The method of claim 1, wherein said step (11) comprises the step of combining texture sample point values using a weighted average.

19. A method for sampling shades and textures in a simulation of motion blur, comprising the steps of:

(1) identifying an intersection point of an edge of a moving polygon with a stationary sampling point;

(2) generating a segment that identifies a span of time that said stationary sampling point is inside said moving polygon;

(3) generating a visible surface list that includes a list of visible segments;

(4) placing one or more polygons that are associated with segments in said visible surface list into a group, wherein said group of polygons have a continuous time coverage over an object;

(5) determining a shading sampling rate for said group, wherein said shading sampling rate is dependent upon a type of surface being shaded; and (6) determining a texture sampling rate for said group, wherein said texture sampling rate is determined independently of said shading sampling rate.

20. A method for simulating motion blur in a computer graphics application that includes at least one three dimensional surface, comprising the steps of:

(1) generating a list of segments, wherein each segment in said list of segments identifies a span of time during which at least a portion of a three dimensional surface intersects with a sampling point;

(2) determining a shading sampling rate for a segment in said list of segments, wherein said shading sampling rate is dependent upon a type of surface being shaded; and (3) determining a texture sampling rate for said segment, wherein said texture sampling rate is determined independently of said shading sampling rate.

21. The method of claim 20, wherein said step (1) comprises the step of generating a list of segments, wherein each segment in said list of segments identifies a span of time that a polygon intersects with a sampling point.

22. The method of claim 20, wherein said step (1) comprises the step of generating a list of segments, wherein at least one segment in said list of segments identifies a span of time that a continuous portion of said three dimensional surface intersects with a sampling point.

23. The method of claim 20, wherein said step (1) comprises the step of generating a list of segments, wherein at least one segment in said list of segments identifies a span of time that a continuous portion of a non-uniform rational bspline surface intersects with a sampling point.

24. A computer program product, comprising:
a computer usable medium having computer readable program code means embodied in said medium that provides motion blur simulation, said computer readable program code means comprising:
computer readable program code means for causing a computer to identify an intersection point of an edge of a moving polygon with a stationary sampling point;
computer readable program code means for causing a computer to generate a segment that identifies a span of time that said stationary sampling point is inside said moving polygon;

computer readable program code means for causing a computer to generate a visible surface list that includes a list of visible segments;

computer readable program code means for causing a computer to place one or more polygons that are associated with segments in said visible surface list into a group, wherein said group of polygons have a continuous time coverage over an object;

computer readable program code means for causing a computer to determine a shading sampling rate for said group, wherein said shading sampling rate is dependent upon a type of surface being shaded; and computer readable program code means for causing a computer to determine a texture sampling rate for said group, wherein said texture sampling rate is determined independently of said shading sampling rate.

\* \* \* \* \*